Jan. 24, 1956    G. ZOBEL    2,732,231
PIPE JOINT WITH DETENT AND GASKET FOR DIVING SUIT
Filed Oct. 21, 1952    2 Sheets-Sheet 1

INVENTOR.
GERALD ZOBEL
BY
HIS ATTORNEYS

Jan. 24, 1956   G. ZOBEL   2,732,231
PIPE JOINT WITH DETENT AND GASKET FOR DIVING SUIT
Filed Oct. 21, 1952   2 Sheets-Sheet 2
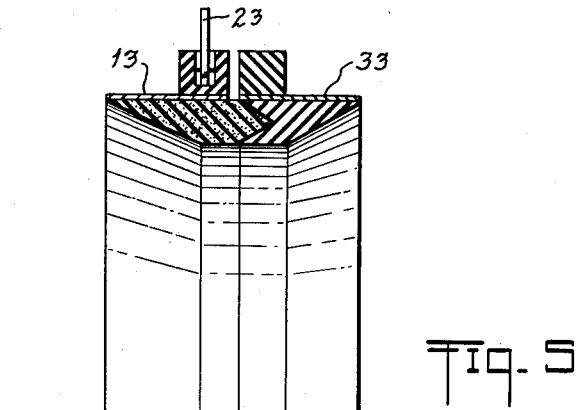
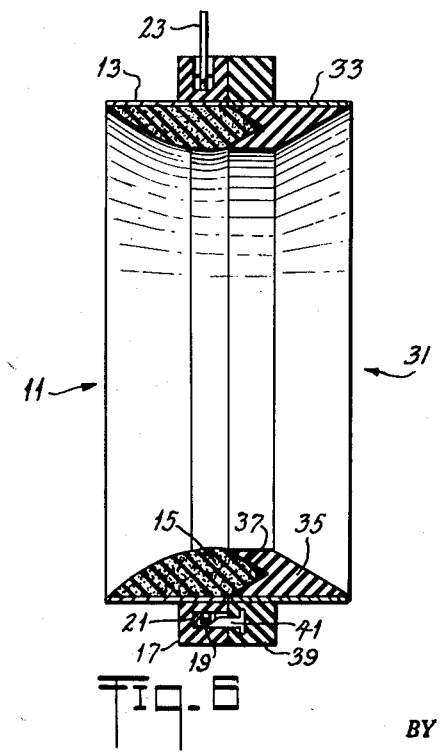
INVENTOR.
GERALD ZOBEL
BY
HIS ATTORNEYS

United States Patent Office 2,732,231
Patented Jan. 24, 1956

2,732,231

PIPE JOINT WITH DETENT AND GASKET FOR DIVING SUIT

Gerald Zobel, New York, N. Y.

Application October 21, 1952, Serial No. 316,109

1 Claim. (Cl. 285—174)

(Granted under Title 35, U. S. Code (1952), sec. 266)

The invention described herein may be manufactured and used by or for the Government of the United States of America for governmental purposes without the payment of any royalties thereon or therefor.

This invention relates to a watertight exposure suit worn by military personnel when exposed to special weather or combat conditions and more particularly to a coupling device for effecting a watertight closure between two elements.

Exposure suits are worn by military and non-military personnel while performing hazardous work or while exposed to the elements. Such suits are expensive to manufacture and usually have to be tailored to the wearer. However, the suits are not effective for preventing liquid from seeping into boots, gloves or hoods worn by a wearer, and therefore do not afford complete protection.

In order to secure a watertight closure between the leg cuff and a boot, a sleeve and a gauntlet or between a hood and the body shell of an exposure suit means were devised to provide a simple coupling device to accomplish the desired result. Said coupling device consists of a tongue and groove arrangement, the tongue element being attached to the leg cuff, sleeve or body shell of the suit and the groove element being attached to the boot, gauntlet or hood. A watertight seal is realized by inserting the tongue element into the groove element.

An object of the present invention is to overcome the above disadvantage by providing a device for effecting a watertight seal between two elements.

Another object of the invention is to provide a device for connecting a pair of hollow structures, for example the sleeve of a suit and a gauntlet.

A further object of the invention is to provide a watertight coupling device easily manipulatable that is inexpensive to produce.

These and other objects of the invention and the various features and details of construction and operation thereof are hereinafter more fully set forth and described with reference to the accompanying drawings in which like numbers refer to like parts.

Fig. 5 is a view partly in section of the tongue and groove elements in a mating relationship with each other prior to complete engagement.

Fig. 6 is a view partly in section of the tongue and groove elements in a mating relationship with each other in full engagement.

Figure 3:
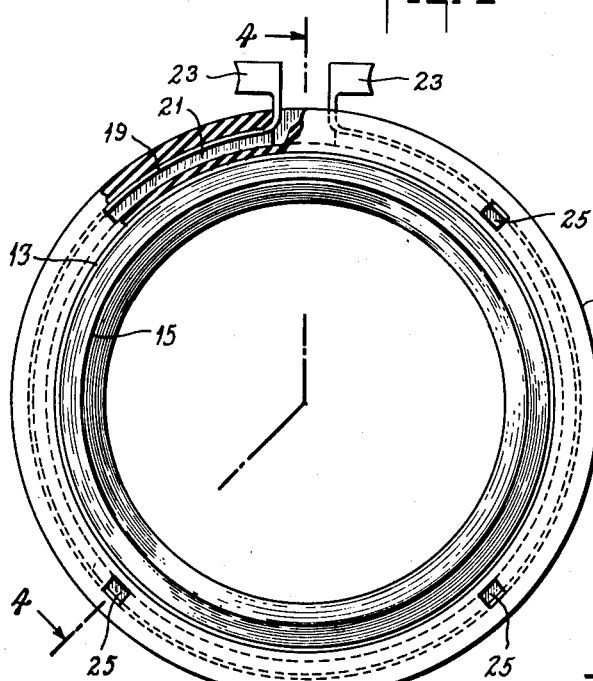
Fig. 3 is an end view, partly in section of the tongue element of the invention.
Figure 4:
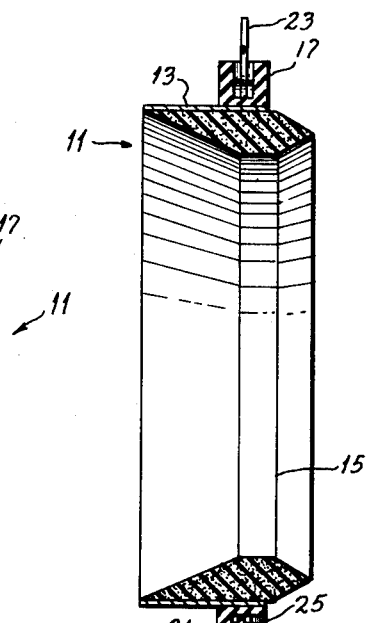
Fig. 4 is a view partly in section of the invention taken along line 4—4 of Fig. 3.

Watertight exposure suits (not shown) can be made of fabric coated with rubber or other suitable plastic. Suitably attached to the extremities (such as leg cuffs, sleeves or body shell) of such suits with rubber cement or other suitable adhesive agent is a male or tongue member 11 (see Figs. 3 and 4) having a rigid circular metal ring 13. Concentric with said metal ring and fixedly attached to its inner surface is a tongue 15 composed of soft-molded rubber. A hard rubber bead 17 concentric with said ring is fixedly attached to said metal ring at its outer surface. Channeled into a groove 21 in bead 17 is a flexible split-ring 19, said split-ring having a pair of compression grips 23 situated at its ends to provide means for increasing or decreasing the diameter of ring 19. Small openings 25 are spaced on the closure edge of bead 17 to provide access to ring 19.

Figure 1:
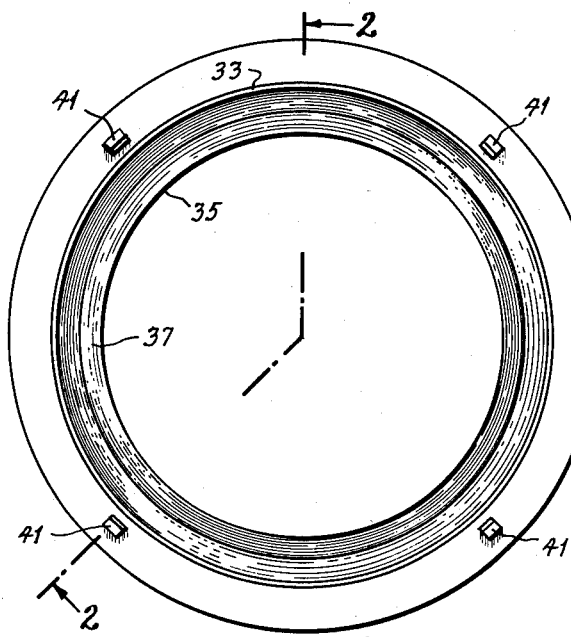
Fig. 1 is an end view of the groove element of this invention.
Figure 2:
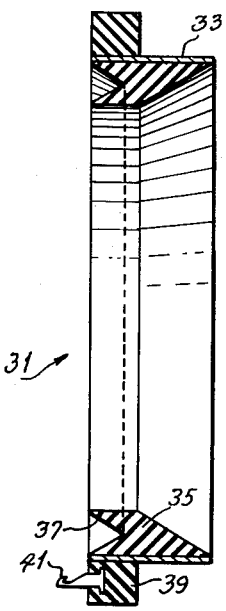
Fig. 2 is a view partly in section of the invention taken along line 2—2 of Fig. 1.

A female or groove element 31 (see Figs. 1 and 2) into which tongue member 11 seats is suitably attached with rubber cement or other adhesive agent to a boot, gauntlet or protective hood covering (not shown). Said element 31 is dimensioned to engage with element 11 and has a rigid circular metal ring 33 similar to ring 13. Concentric with ring 33 and fixedly attached to its inner surface is a hard rubber gasket 35, said gasket having a groove 37 shaped to accept tongue 15 of element 11. A hard-rubber bead 39 concentric with ring 33 is fixedly attached to said ring at its outer surface. Rigidly embedded in the closure edge of bead 39 are metal retaining hooks 41 adapted to project into openings 25 of bead 17.

The leg cuff, sleeve or body shell of the exposure suit is coupled to a boot, gauntlet or protective hood by inserting tongue member 11 into groove member 31. Said members are brought into close contact with each other and aligned so that retaining hooks 41 project into openings 25 as shown in Fig. 5. A manual compressive force is applied to grips 23 of member 11 to decrease the diameter of split-ring 19, thereby allowing hooks 41 to further penetrate openings 25. Simultaneously, pressure is applied to both members 11 and 31 enabling hook 41 to slide under ring 19. During this operation tongue 15 is firmly entrenched in groove 21 forming a watertight seal. When grips 23 are released, split-ring 19 tends to expand to its normal diameter but is stopped by the mouth of hook 41. Upon release of pressure applied to members 11 and 31, retaining hook 41 engages split-ring 19 causing a secure attachment between said two members and a watertight seal between tongue 15 and groove 35 results. (See Fig. 6.)

Disengagement of the disconnect device is accomplished by exerting a manual compressive force to grips 23. Said operation causes the diameter of split-ring 19 to decrease, thereby disengaging hook 41 from said split-ring permitting the two members to be separated.

It is seen that the present device provides a coupling device of simple construction, easily manipulatable for effecting a watertight seal between two elements. The size of the mechanism can be varied to suit particular requirements by slight modifications and can be employed for purposes other than exposure suits, such as hose couplings.

While a particular embodiment of the invention has been shown and described herein, it is not intended that the invention be limited to such disclosure, but that changes and modifications can be made and incorporated within the scope of the claim.

What is claimed:

A watertight garment-joint coupling comprising a first annular member having a tongue-shaped projection thereon and having an annular opening therein, a second annular member having a groove-shaped depression therein sealingly receiving said projection, a resilient one piece split-ring positioned in said annular opening in said first member, the ends of said split ring extending outwardly therefrom, compression grips on the ends of said ring, said ring being biased into the outer peripheral portion of said opening, axial openings in and circumferentially spaced around the closure edge of said first member and extending to said opening, and hooks circumferentially spaced around and rigidly mounted on the closure edge of said second member and adapted to enter through said axial openings for detachably engaging the outer peripheral portion of said ring.

References Cited in the file of this patent

UNITED STATES PATENTS

| | | |
|---|---|---|
| 836,524 | Morrell | Nov. 20, 1906 |
| 1,204,921 | Wills | Nov. 14, 1916 |
| 2,158,398 | Bryant | May 16, 1939 |
| 2,274,258 | Roselle | Feb. 24, 1942 |
| 2,306,488 | Morner | Dec. 27, 1942 |
| 2,353,572 | Kuster et al. | July 11, 1944 |
| 2,379,498 | Shaw | July 3, 1945 |
| 2,390,462 | Rosenberg | Dec. 4, 1945 |
| 2,440,452 | Smith | Apr. 27, 1948 |
| 2,470,359 | McLean | May 17, 1949 |
| 2,517,748 | Williams | Aug. 8, 1950 |
| 2,521,174 | Krupp | Sept. 5, 1950 |
| 2,567,298 | Morner et al. | Sept. 11, 1951 |